United States Patent
Rojas et al.

(10) Patent No.: US 6,800,592 B2
(45) Date of Patent: Oct. 5, 2004

(54) POLYMER-ENHANCED FOAMABLE DRILLING FLUID

(75) Inventors: Yenny Virginia Rojas, Edo. Miranda (VE); Alida del Carmen Aponte, Edo. Miranda (VE)

(73) Assignee: Intevep, S.A., Caracas (VE)

(*) Notice: Subject to any disclaimer, the term of this patent is extended or adjusted under 35 U.S.C. 154(b) by 17 days.

(21) Appl. No.: 09/941,508

(22) Filed: Aug. 28, 2001

(65) Prior Publication Data

US 2003/0078168 A1 Apr. 24, 2003

(51) Int. Cl.$^7$ ............................................. C09K 7/02
(52) U.S. Cl. .................. 507/102; 507/110; 507/134; 507/141; 507/145
(58) Field of Search .................... 507/102, 110, 507/202, 134, 141, 145; 516/14

(56) References Cited

U.S. PATENT DOCUMENTS

| | | | |
|---|---|---|---|
| 3,313,362 A | * 4/1967 | Schneider | 507/102 |
| 4,013,568 A | 3/1977 | Fischer et al. | |
| 4,088,583 A | 5/1978 | Pyle et al. | |
| 4,599,188 A | 7/1986 | Llenado | |
| 5,026,735 A | * 6/1991 | Stern | 521/50 |
| 5,360,558 A | * 11/1994 | Pakulski et al. | 507/202 |
| 5,495,891 A | 3/1996 | Sydansk | |
| 5,513,712 A | 5/1996 | Sydansk | |
| 5,566,760 A | * 10/1996 | Harris | 507/202 |
| 5,591,701 A | 1/1997 | Thomas | |
| 5,706,895 A | * 1/1998 | Sydansk | 507/202 |
| 5,716,910 A | 2/1998 | Totten et al. | |
| 5,783,525 A | * 7/1998 | Blanco et al. | 507/252 |
| 5,821,203 A | 10/1998 | Williamson | |
| 5,851,960 A | 12/1998 | Totten et al. | |
| 5,990,052 A | * 11/1999 | Harris | 507/202 |
| 6,172,010 B1 | 1/2001 | Argillier et al. | |
| 6,302,209 B1 | * 10/2001 | Thompson et al. | 166/305.1 |
| 6,410,489 B1 | * 6/2002 | Zhang | 507/202 |

FOREIGN PATENT DOCUMENTS

| | | |
|---|---|---|
| EP | 0 761 798 | 3/1997 |
| WO | WO 95/14066 | 5/1995 |
| WO | WO 00/51922 | 9/2000 |

* cited by examiner

*Primary Examiner*—Philip C. Tucker
(74) *Attorney, Agent, or Firm*—Bachman & LaPointe, P.C.

(57) ABSTRACT

A foamable drilling fluid is provided which includes an aqueous solvent; a surfactant; and a polysaccharide preferably derived from a galactomannan gum. The foamed drilling fluid includes a liquid phase consisting of the aqueous solvent, polysaccharide and surfactant, and a gas phase of air, nitrogen, natural gas, $CO_2$ and mixtures thereof. The drilling fluid is stable in the presence of crude oil and salt and environmentally friendly.

14 Claims, 2 Drawing Sheets

POLYMER-ENHANCED FOAMABLE DRILLING FLUID

BACKGROUND OF THE INVENTION

The invention relates to a drilling fluid and, more particularly, to a stable and environmentally safe foamable drilling fluid.

In the course of drilling a subterranean well, drilling fluids are needed in order to lubricate the drill bit and to carry formation cuttings to the surface. In addition, the drilling fluid is needed in order to balance high-pressures encountered in subterranean formation.

Foamed drilling fluids are known and used in situations wherein reduced density is desired, for example in low-pressure formations, wherein the other functions of a drilling fluid are still needed. In low-pressure formations, the use of fluids having higher density can result in a partial or total fluid loss into the formation, which can result in increased drilling cost, formation fracturing and/or damage, and even well loss.

In such instances, under-balanced drilling is typically performed in order to avoid such desirable occurrences and, if necessary, permit a short influx from the formation.

A number of problems are experienced with known foamable drilling fluids. These include short stability periods in the presence of formation contaminants, poor transportation capability, short reutilization cycles and environmental issues.

It is clear that the need remains for a foamable drilling fluid, which is stable in the presence of formation contaminants such as crude oil and/or salt, which has effective cutting transport capability, which exhibits good reutilization cycles through re-generation of foam at the surface, and which is environmentally friendly.

It is therefore the primary object of the present invention to provide a foamable drilling fluid having these properties.

Other objects and advantages of the present invention will appear hereinbelow.

SUMMARY OF THE INVENTION

In accordance with the present invention, the foregoing objects and advantages have been readily attained.

According to the invention, a foamable drilling fluid is provided which comprises an aqueous solvent, a surfactant, and a guar polysaccharide preferably derived from a galactomannan gum, and most preferably guar gum.

In accordance with a further aspect of the present invention, a foamed drilling fluid is provided, which comprises a liquid phase comprising an aqueous solvent, a polysaccharide preferably derived from a galactomannan gum and a surfactant; and a gas phase selected from the group consisting of nitrogen, air, natural gas, $CO_2$ and combinations thereof.

The polysaccharide additive of the present invention has been found to advantageously provide for excellent stability and cutting transport capacity, while nevertheless being environmentally friendly.

BRIEF DESCRIPTION OF THE DRAWINGS

A detailed description of preferred embodiments of the present invention follows, with reference to the attached drawings, wherein.

DETAILED DESCRIPTION

Figure 1:
FIGS. 1 and 2 illustrate drilling fluid in accordance with the present invention and conventional drilling fluid when contaminated with crude oil.

The invention relates to a foamable drilling fluid which contains a particular class of polymer that has been found in accordance with the present invention to provide the fluid with excellent stability when foamed even in the presence of crude oil and salt, which provides for good cuttings transport capability, desirable density values, and sufficient reutilization cycles, and which also results in an environmentally friendly fluid.

In accordance with the present invention, the fluid contains an aqueous solvent phase containing a surfactant, a polysaccharide preferably derived from a galactomannan gum, most preferably guar gum, and, preferably, a monovalent salt. The gas phase of the foamable drilling fluid, when foamed, may be any suitable gas and is preferably selected from the group consisting of nitrogen, air, natural gas, $CO_2$ and combinations thereof.

The aqueous solvent may be any suitable liquid into which the additives are soluble, such as water or the like.

The surfactant is preferably an ethoxylated alcohol sulfate, and sodium lauryl ether sulfate has been found to be particularly suitable for use in accordance with the present invention, particularly when having three moles of EO. Of course, other types of surfactants could be used, such as ammonium lauryl ether sulfate, sodium lauryl sulfate, ammonium lauryl sulfate, triethanolamine lauryl sulfate, sodium alpha-olefin sulfonate and the like.

The class of polymer useful in accordance with the present invention as a polysaccharide source, specifically guar gum polymers, have been found to advantageously provide an additive to the drilling fluid of the present invention which provides for excellent stability and fluid characteristics while nevertheless providing an environmentally friendly and biodegradable drilling fluid.

Particularly desirable polysaccharides include polysaccharide polymers derived from galactomannan gum, such as hydroxypropyl guar, guar gum, and hydroxypropyl carboxymethyl guar. The most preferred polysaccharide derivative for use in this invention is a hydroxypropyl guar gum derivative, which provides the drilling fluid of the present invention with excellent characteristics at reasonably small amounts, for example between about 1.5 and about 3.0% w/v, and molecular weights between 1,500,000 and 4,000,000.

The surfactant may be present in an amount between about 0.3% and about 1.0% w/v, and the salt in an amount between about 0.1% and about 0.5% w/v.

The salt serves to stabilize the foam by means of repulsive forces due to the presence of polar groups at the interface, and may suitably be a monovalent salt such as potassium chloride, sodium chloride, potassium acetate and mixtures thereof.

The foamed drilling fluid, as set forth above, includes a gas phase which may suitably be nitrogen, air, natural gas, $CO_2$ and the like. The foamed drilling fluid can be prepared using any known technique, and can be prepared at laboratory scale for example through mechanical mixing and gas injection.

The drilling fluid in accordance with the present invention is provided having different amounts of components so as to provide the desired resulting foamable fluid having stability, density, viscosity and other parameters as desired. For example, the foamed drilling fluid according to the invention may suitably have a density of between about 1.15 and about 5.0 ppg, and a volumetric gas fraction or quality of between about 45 and about 95% v/v. Viscosity at temperatures up to about 180° F. for fluids having a quality of between about 80 and about 95% v/v is between about 25 and about 50 cP.

In accordance with the present invention, it is particularly preferred to provide the liquid phase of the fluid containing polymer, surfactant and salt additives as set forth below in Table 1:

TABLE 1

| Additive | Concentration range, % w/v |
| --- | --- |
| Hydroxypropyl guar polymer | 1.5–3.0 |
| Surfactant selected from the group of ethoxylated alcohol sulfates (sodium lauryl ether sulfates with 3 moles EO) | 0.3–1.0 |
| Monovalent salt (KCl ar NaCl) | 0.1–0.5 |

The foamable drilling fluid in accordance with the present invention is particularly useful for low-pressure applications, for example in depleted or partially depleted reservoir areas where lower density drilling fluids are needed. In such environments, a foamed drilling fluid in accordance with the present invention is particularly advantageous in that formation damage due to drilling fluid filtrate into the formation can be substantially reduced, while nevertheless maintaining the cutting carrying capacity of the drilling fluid and while maintaining normal penetration rates.

A further advantage of the drilling fluid of the present invention is that the fluid stability helps maintain cuttings in the fluid for periods of time while drilling is ceased, such that cuttings do not return downhole.

Another advantageous feature of the fluid of the present invention is that the stability is not impacted at high temperatures which are frequently encountered in subterranean formations.

Still further, the drilling fluid of the present invention maintains stability when exposed to substantial amounts of crude oils, and/or salts, which of course are frequently encountered contaminants when drilling through subterranean formations. Depending upon the physico-chemical composition of the crude oil, large amounts of contamination can significantly increase foam stability, and the foam stability reactants at contamination levels up to at least about 50% w/v of crude oil.

The fluid of the present invention is stable at temperatures up to at least 180° F., and has a foam half lifetime of at least about 17 minutes.

Finally, the foamed drilling fluids in accordance with the present invention can be collapsed, or broken down for example at the surface, if desired, by adding low molecular weight alcohol, defoamers and/or pH adjusting additives. These breakdown mechanisms do not cancel the effect of the surfactant and permit regeneration of the foam by using the same foaming solution with a minimal amount of additional additives. This may be desirable in order to decrease the cost of the drilling fluid and provide good surface control.

The following examples further demonstrate the excellent characteristics of the drilling fluid of the present invention.

EXAMPLE 1

In this example, a drilling fluid in accordance with the present invention is compared to a commercial Transfoam O fluid.

The drilling fluid in accordance with the present invention (Foamdrill) was prepared utilizing water as an aqueous solvent, wherein the aqueous solvent contained sodium lauryl ether sulfate having three moles of EO, hydroxypropyl guar polymer and potassium chloride in amounts set forth in Table 2 below.

The foam was formed using air, in a mechanical mixing method. The foam was prepared and mixed with 10% w/v of crude oil in order to determine static foam stability.

A commercially available fluid (Transfoam O) was prepared containing an anionic Transfoam O surfactant, non-ionic Dionic 900 polymer, and KCl as salt in the amount set forth in Table 2 below, also using air as the gas phase and a mechanical mixing method. The foam was prepared and mixed containing crude oil in an amount of 10% w/v so as to determine the static foam stability.

TABLE 2

| Concentration (% w/v) | FOAMDRILL | TRANSFOAM 0 |
| --- | --- | --- |
| Surfactant | 0.5 | 1.0 |
| Polymer | 0.2 | 0.4 |
| Salt | 0.5 | 0.5 |
| Foam Level (ml) | 400 | 540 |
| Half life time (min) | 26.7 | 5.8 |

As shown in Table 2, the drilling fluid of the present invention (Foamdrill) reached a foam level of 400 ml, and maintained this foam level for a half life time of 26.7 minutes. The half life time is defined as the time during which the column reduces in height to half of the beginning level.

By contrast, the Transfoam O fluid reached a foam level of 540 ml, but also reached the half lifetime in only 5.8 mins. Clearly, the foam of the present invention is more stable in the presence of crude oil than the conventional Transfoam O fluid, and is therefore beneficial for use as a drilling fluid in accordance with the present invention.

EXAMPLE 2

Figure 2:

This example demonstrates the advantageous characteristics of the foam of the present invention when exposed to 10% w/v oil contamination, and when prepared using an air expansion method. Both foam formulations were prepared using concentrations as shown in Table 2. As shown in FIGS. 1 and 2, the drilling fluid of the present invention (FIG. 1) exhibits higher stability in the presence of crude oil contamination than the commercial formulation (FIG. 2). Further, the foam of the present invention, as shown, is homogeneous and uniform, while in contrast, the conventional foam has bubbles with different sizes, and is not uniform, and the foam is substantially broken.

EXAMPLE 3

In this example, a drilling fluid was prepared in accordance with the present invention as described in Example 1, and mixed with a 50% w/v amount of crude oil. A commercial drilling fluid (Transfoam O) was also prepared and mixed with crude oil in an amount of 50% w/v.

Figure 3:
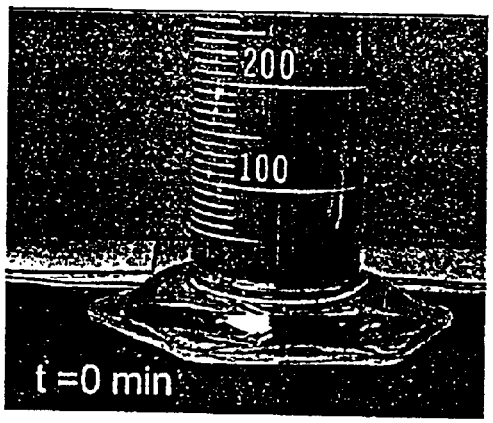
FIGS. 3 and 4 further illustrate drilling fluid in accordance with the present invention and conventional drilling fluid when contaminated with greater amounts of crude oil.
Figure 4:
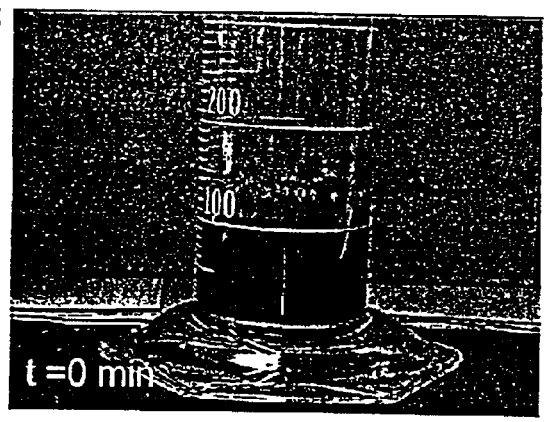

While the drilling fluid of the present invention maintained a foam structure when allowed to rest (FIG. 3), the commercial fluid immediately separated to well below the half life level (FIG. 4). This occurred using both mechanical mixing methods and air expansion foam forming methods.

Figure 5:
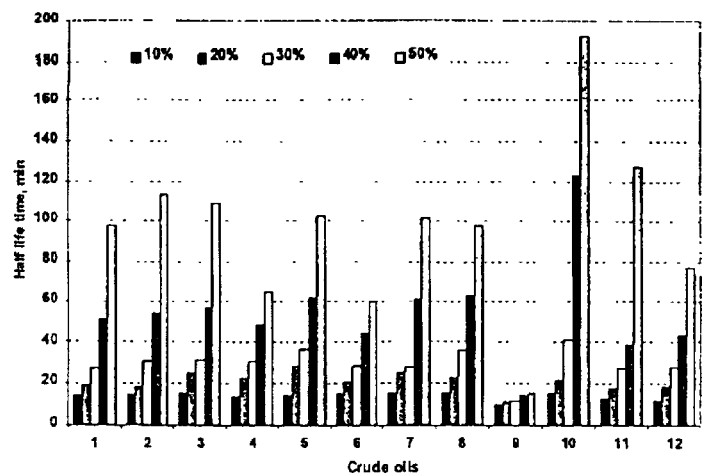
FIG. 5 illustrates the relationship between crude oil quantity of contamination and foam stability in terms of half life time.

FIG. 5 shows the influence of crude oil concentration on stability of the foam of the present invention. As shown, as the crude oil contamination increases, foam stability also significantly increases. Further, the increase in foam stability is more substantial with certain types of crude oil. Highly acidic crude oils do tend to reduce the foam stability to some extent, although greater stability still occurs at higher oil concentrations. This demonstrates that the foam can be broken down in the presence of acidic crude oils, and on the other hand, that crude oils with similar chemical compositions exhibit similar foam stability.

EXAMPLE 4

In this example, a drilling fluid in accordance with the present invention and as described in Example 1 above was prepared and mixed with different amounts of crude oils. Once thoroughly mixed, the foam was then allowed to stand and the half life time was measured. The physical-chemical properties of crude oils investigated in this example are shown in Table 3.

Biodegradation of the components of the fluids of the present invention was also measured over time under aerobic and anaerobic conditions, as compared to basic glucose.

Figure 6:
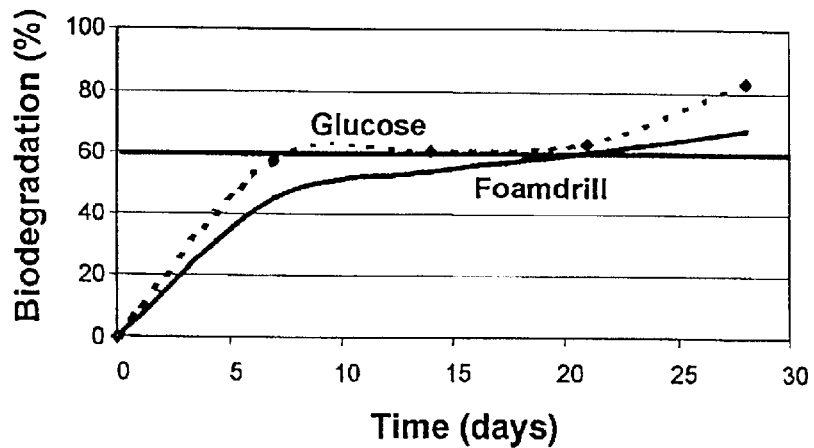
FIG. 6 illustrates biodegradation of a drilling fluid in accordance with the present invention in aerobic conditions.
Figure 7:
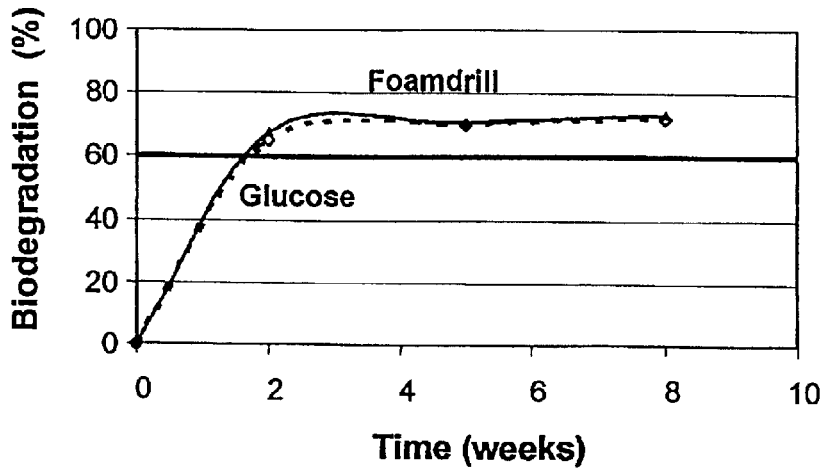
FIG. 7 illustrates biodegradation of a drilling fluid in accordance with the present invention in anaerobic conditions.

FIGS. 6 and 7 illustrate the results obtained, wherein the fluid of the present invention is illustrated as "Foamdrill". As shown in FIG. 6, under aerobic conditions, the "Foamdrill" fluid reaches a 60% biodegradation level quite rapidly and has a biodegradation profile comparable to glucose.

In FIG. 7, for the anaerobic biodegradation of the Foamdrill fluid is nearly identical to glucose.

Thus, the drilling fluid of the present invention exhibits excellent biodegradability and is therefore extremely environmentally friendly.

EXAMPLE 6

In this Example, the cleaning capacity of the Foamdrilling fluid in accordance with the present invention is demonstrated. A pilot test was carried out in well P-203, of the La Paz field, in Venezuela. A 12¼" hole was drilled in the aforementioned well using 30–50 gallons per minute (gpm) of foam solution and 600–1000 scfm of nitrogen. Drilling was carried out using minimum annular velocities of 45 ft/min. During the course of drilling, increments of injection pressures were not observed, drilling cuttings in the shakers were as expected according to the drilling rate, problems due to physical obstruction of cuttings or cutting deposition in the well was not observed, and the foam maintained a high stability at the well outlet before the breakdown process. All

TABLE 3

| Crude Oil | Water by Distill % | Dehydration % | Salt by conduct PTB | API Gravity @ 60° F. | Ac. Num. mg KOH/g crude oil | Saturated % w/w | Aromatic % w/w | Resins % w/w Asphalt % w/w | Asphalt % w/w |
|---|---|---|---|---|---|---|---|---|---|
| 1 | D | — | 5.2 | 24.7 | 0.38 | 41.1 | 42.3 | 12.2 | 4.4 |
| 2 | D | — | 6.6 | 25.9 | 0.41 | 40.9 | 43.9 | 11.2 | 4.0 |
| 3 | D | — | 3.1 | 30.7 | 0.23 | 49.3 | 41.4 | 8.5 | 0.8 |
| 4 | 6.95 | 6.18 | 37.5(D) | 25.6(D) | 0.16(D) | 44.6 | 43.4 | 8.8 | 3.3 |
| 5 | 3.99 | 7.37 | 35.3(D) | 25.4(D) | 0.29(D) | 43.0 | 42.0 | 11.4 | 3.6 |
| 6 | D | — | 4.4 | 28.2 | 0.30 | 45.4 | 40.6 | 11.1 | 2.9 |
| 7 | D | — | 3.4 | 28.5 | 0.25 | 46.9 | 44.7 | 7.2 | 1.2 |
| 8 | D | — | 6.0 | 25.5 | 0.32 | 39.8 | 40.8 | 14.0 | 5.4 |
| 9 | 4 | — | 23.8(D) | 11.4 | 4.98 | 16.5 | 51.4 | 22.5 | 9.6 |
| 10 | 2 | — | 282.8 | 10.4 | 1.82 | 28.6 | 44.0 | 23.2 | 4.2 |
| 11 | <0.1 | — | — | 22.5 | — | 29.9 | 44.3 | 17.9 | 7.9 |
| 12 | 1.2 | — | — | 34 | — | — | — | — | — |

Even with a 10% contamination of crude oil, the foam maintained a half life of approximately 1020 seconds.

EXAMPLE 5

In this example, the toxicology of the drilling fluid additives of the present invention, as well as biodegradability, was evaluated.

In this example, toxicity ($CL_{50}$-96 h) of the additives of the drilling fluid of the present invention was evaluated. In this type of testing, the higher the $CL_{50}$ number, the lower the actual toxicity of the component. The surfactant of the present invention was found to have a toxicity of 300 mg/l, while the polymer component was found to have toxicity of greater than about 500 mg/l. As compared to commercial surfactant, these toxicities are substantial improvements. For example, a number of commercial surfactants were evaluated which have toxicities in the range of about 25 up to about 250 mg/l, all of which are substantially lower than, and therefore more toxic than, the ingredients of the present invention.

of these characteristics demonstrate an excellent cleaning capacity of the foam drilling fluid in accordance with the present invention.

EXAMPLE 7

In the same pilot test as carried out in Example 6, an effective fluid reutilization cycle was also conducted. The foam was formed and, upon exiting the well, was broken using alcohol and defoamer. The foaming solution with drilling cutting were separated and sent to shakers in order to separate the solids and regain the solution to be used again. With minimal addition of new components, the foam was regenerated approximately 76 times. This shows excellent re-usability of the fluid in accordance with the present invention.

It should be readily apparent that the drilling fluid in accordance with the present invention is stable, and useful in carrying cuttings to the surface during drilling operations, while nevertheless presenting a low density which is useful in low pressure applications so as to avoid formation damage and fluid loss, while also reducing cost.

Further, the drilling fluid is environmentally friendly.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A foamable drilling fluid, comprising:
   an aqueous solvent;
   a surfactant comprising sodium lauryl sulfate;
   a salt selected from the group consisting of salts of potassium, sodium and mixtures thereof; and
   a polysaccharide polymer, wherein said fluid contains said polymer in an amount between about 1.5 and about 3.0% w/v, said surfactant in an amount between about 0.3 and about 1.0% w/v, and said salt in an amount between about 0.1% and about 0.5% w/v.

2. The fluid of claim 1, wherein said polysaccharide is derived from a galactomannan gum.

3. The fluid of claim 2, wherein said galactomannan gum is selected from the group consisting of hydroxypropyl guar, guar gum, hydroxypropyl carboxymethyl guar and mixtures thereof.

4. The fluid of claim 2, wherein said galactomannan gum is hydroxypropyl guar.

5. The fluid of claim 1, wherein said salt is potassium chloride.

6. The fluid of claim 1, wherein the fluid is a foamed fluid containing a gas.

7. The fluid of claim 6, wherein said gas is selected from the group consisting of nitrogen, air, natural gas, $CO_2$ and mixtures thereof.

8. The fluid of claim 6, wherein the foamed fluid has a density of between about 1.15 and about 5.0 ppg.

9. The fluid of claim 6, wherein the foamed fluid has a viscosity of between about 25 and about 50 cP for qualities between about 80 and about 95%, at temperatures up to about 180° F.

10. The fluid of claim 6, wherein the foamed fluid is stable when exposed to oil and salt contaminants.

11. The fluid of claim 6, wherein the foamed fluid is stable when mixed with crude oil up to at least about 50% w/v of crude oil.

12. The fluid of claim 6, wherein the foamed fluid has a half life time of at least about 17 mm.

13. The fluid of claim 6, wherein the foamed fluid is stable at temperatures up to at least about 180° F.

14. A foam drilling fluid, comprising:
   a liquid phase comprising an aqueous solvent, a polysaccharide polymer, a salt selected from the group consisting of salts of potassium, sodium and mixtures thereof and a surfactant comprising sodium lauryl sulfate wherein said fluid contains said polymer in an amount between about 1.5 and about 3.0% w/v, said surfactant in an amount between about 0.3 and about 1.0% w/v, and said salt in an amount between about 0.1% and about 0.5% w/v; and
   a gas phase selected from the group consisting of air, nitrogen, natural gas, $CO_2$ and combinations thereof.

* * * * *